US012569854B2

(12) United States Patent
Malkamäki

(10) Patent No.: US 12,569,854 B2
(45) Date of Patent: Mar. 10, 2026

(54) SEALING MEMBER AND MANTLE COMPRISING SUCH MEMBER, GYRATORY CRUSHER AND METHOD OF INSTALLING

(71) Applicant: Metso Finland Oy, Espoo (FI)

(72) Inventor: Mikko Malkamäki, Pälkäne (SE)

(73) Assignee: Metso Finland Oy, Espoo (FI)

( * ) Notice: Subject to any disclaimer, the term of this patent is extended or adjusted under 35 U.S.C. 154(b) by 872 days.

(21) Appl. No.: 17/048,824

(22) PCT Filed: Apr. 18, 2019

(86) PCT No.: PCT/EP2019/060067
§ 371 (c)(1),
(2) Date: Oct. 19, 2020

(87) PCT Pub. No.: WO2019/202071
PCT Pub. Date: Oct. 24, 2019

(65) Prior Publication Data
US 2021/0237092 A1      Aug. 5, 2021

(30) Foreign Application Priority Data

Apr. 19, 2018      (SE) ..................................... 1850457-1

(51) Int. Cl.
B02C 2/04 (2006.01)
F16J 15/3284 (2016.01)
(52) U.S. Cl.
CPC ............. B02C 2/04 (2013.01); F16J 15/3284 (2013.01)
(58) Field of Classification Search
CPC .... B02C 2/04; B02C 2/00; B02C 2/005; F16J 15/3284; F16J 15/16; F16J 15/32;
(Continued)

(56) References Cited

U.S. PATENT DOCUMENTS 2,224,542 A * 12/1940 Gruender .................. B02C 2/04
241/216
2,280,183 A * 4/1942 Bennett ................. F16L 21/035
285/374
(Continued)

FOREIGN PATENT DOCUMENTS

CN 202061647 U 12/2011
CN 203955274 U 11/2014
(Continued)

OTHER PUBLICATIONS

International Search Report and Written Opinion for International Application No. PCT/EP2019/060067 mailed Jul. 4, 2019.
(Continued)

*Primary Examiner* — Christopher L Templeton
*Assistant Examiner* — Teresa A Guthrie
(74) *Attorney, Agent, or Firm* — Andrus Intellectual Property Law, LLP

(57) ABSTRACT

A sealing member for a gyratory crusher having a main shaft and a mantle. The sealing member includes a first side and a second, opposing, side. The first side is arrangeable on a circumference of an inner wall of the mantle of the gyratory crusher. At least a portion of the second side is at a distance from the first side, the distance being not less than the difference between a radius of the inner wall of the mantle where the sealing member is arrangeable and a radius of the outer wall of the main shaft where the sealing is to contact the main shaft for sealing a space between the mantle and the main shaft. The sealing member creates a seal between the inner wall of the mantle and the outer wall of the main shaft and centers the mantle on the main shaft during installation of the mantle.

12 Claims, 4 Drawing Sheets

(58) Field of Classification Search
CPC .. F16J 15/3204; F16J 15/3224; F16J 15/3268;
B23P 19/04
USPC ............................................. 241/293; 29/428
See application file for complete search history.

(56) References Cited

U.S. PATENT DOCUMENTS

| | | | | | |
|---|---|---|---|---|---|
| 2,561,884 | A | * | 7/1951 | Perrow | F16L 21/035 |
| | | | | | 285/423 |
| 3,954,082 | A | * | 5/1976 | Roller | B63H 20/007 |
| | | | | | 310/87 |
| 4,258,935 | A | * | 3/1981 | Rodrigo | B29C 65/34 |
| | | | | | 285/21.2 |
| 5,080,294 | A | * | 1/1992 | Dean | B02C 2/005 |
| | | | | | 241/300 |
| 5,762,274 | A | * | 6/1998 | Jacobson | B02C 2/04 |
| | | | | | 241/207 |
| 6,299,083 | B1 | * | 10/2001 | Polinski | B02C 2/06 |
| | | | | | 241/207 |
| 2005/0012329 | A1 | * | 1/2005 | Brown | F16L 27/073 |
| | | | | | 285/272 |
| 2008/0290200 | A1 | * | 11/2008 | Eriksson | B02C 2/005 |
| | | | | | 241/291 |

FOREIGN PATENT DOCUMENTS

| | | | | | |
|---|---|---|---|---|---|
| DE | | 19609178 A1 | 9/1997 | | |
| GB | | 630978 A | 10/1949 | | |
| WO | | 2004104352 A1 | 12/2004 | | |
| WO | WO-2014135307 A1 | * | 9/2014 | | B02C 2/04 |
| WO | WO-2015000626 A1 | * | 1/2015 | | B02C 2/00 |

OTHER PUBLICATIONS

International Preliminary Report on Patentability for International Application No. PCT/EP2019/060067 mailed Jul. 15, 2020.
Chilean Search and Examiner's Report for corresponding Chilean Application No. 202002638 mailed Sep. 13, 2021.

* cited by examiner

*100*
*3*
*1*
*4*
*4*
*1*
*4*
*3*
*Prior art* *Fig. 1*

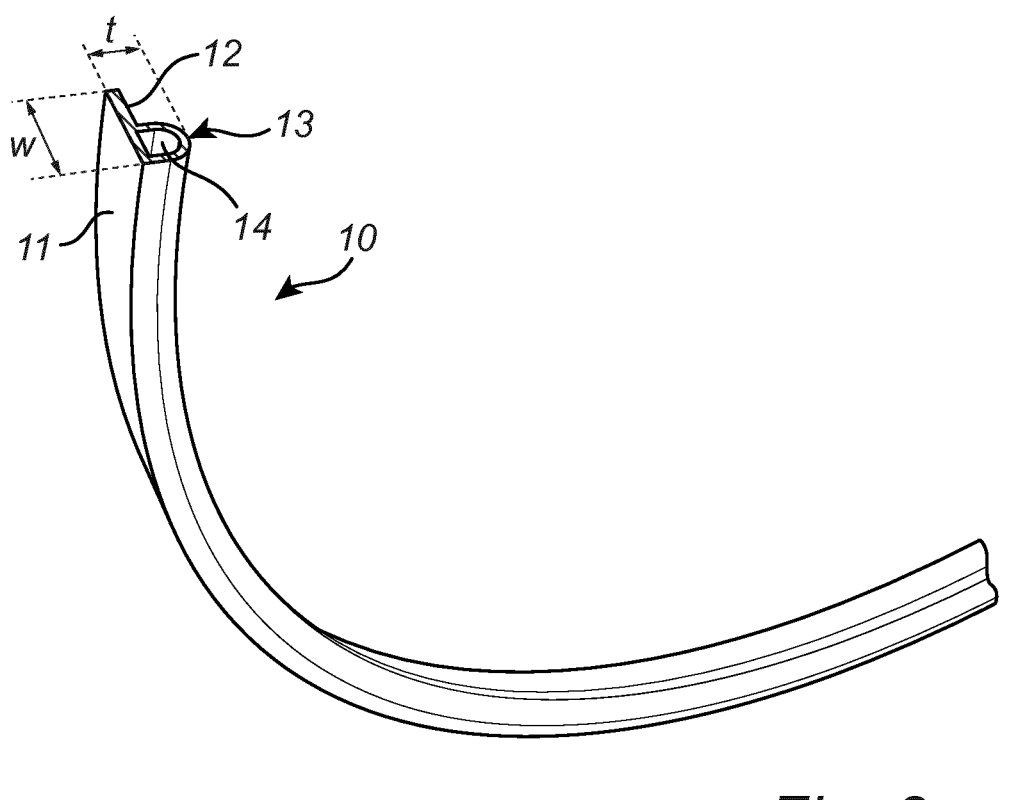
*Fig. 2a*
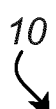
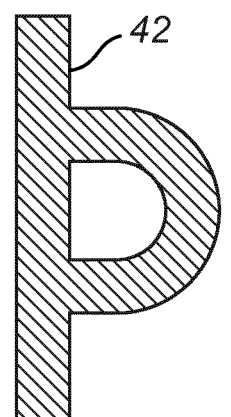
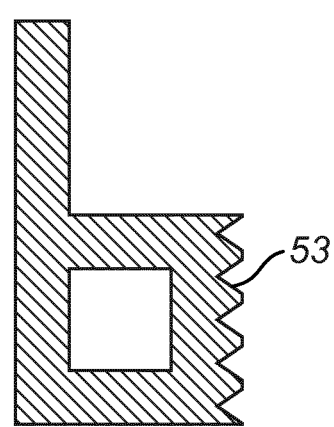
*Fig. 2b*
*Fig. 2c*
2 pt

SEALING MEMBER AND MANTLE COMPRISING SUCH MEMBER, GYRATORY CRUSHER AND METHOD OF INSTALLING

CROSS-REFERENCE TO RELATED APPLICATIONS

This application is the U.S. national stage application of International Application PCT/EP2019/060067, filed Apr. 18, 2019, which international application was published on Oct. 24, 2019, as International Publication WO 2019/202071 A1 in the English language. The International Application claims priority of Swedish Patent Application No. 1850457-1 filed Apr. 19, 2018.

TECHNICAL FIELD

The present invention relates to the field of gyratory crushers, and more particularly to a sealing member for use between a mantle of a gyratory crusher and a taper of a main shaft of such gyratory crusher, and a gyratory crusher comprising such a sealing member.

BACKGROUND

Gyratory crushers generally comprise a concave surface and a conical head. The inner cone has a slight circular movement, generated by an eccentric arrangement. Material to be crushed travels downward between the two surfaces being progressively crushed until it is small enough to fall out through a gap between the two surfaces. Gyratory crushers are typically categorized by size either by the gap between the two surfaces and mantle diameter or by the size of a receiving opening. The crushing action is caused by the closing of the gap between the moveable mantle mounted on the main shaft and the fixed concave liners mounted on the main frame of the crusher. The gap is opened and closed by the eccentric arrangement on the bottom of the spindle that causes the central vertical spindle to gyrate.

When installing the mantle of a gyratory crusher, the mantle mainly being supported by backing material, the mantle is lifted by means of hydraulic lifting tools, lifting the mantle against a head nut of the crusher for a correct height positioning, such that the upper part of the mantle is in contact with the head nut throughout the circumference of the mantle. Subsequently, centralization of the mantle around the main shaft is generally done by positioning four wedges at the lower part of the mantle at different locations around the circumference of the main shaft, such that a distance between the lower part of the mantle and the main shaft is equal at all points. The space formed by the wedges between the main shaft and the mantle then needs to be sealed, in order to be able to fill the space between the main shaft and the mantle such that backing material can be contained in a gap between the upper part of the mantle and the main shaft. The sealing is usually performed by applying plaster of Paris in the space to be sealed. Finally, after sealing, backing material can be added to the gap between the upper part of the mantle and the main shaft from the top. Liquid backing material is commonly used, which upon curing hardens such that it can hold the weight of the mantle. When curing is completed, the mantle can be released from any lifting tools and the head nut is fully tightened against the mantle. This method of centralization and sealing the mantle is time consuming, considering that the positioning of the wedges is made by hand. It also constitutes a safety risk as the mantle, often with a weight of 5 to 13 tons, is supported by hydraulic or other support means while the manual positioning of the wedges is carried out.

SUMMARY OF THE INVENTION

An object of the invention is to overcome, or at least lessen the above mentioned problems. A particular object is to provide an efficient and safe way of installing and handling a mantle for a gyratory crusher.

To better address this concern, in a first aspect of the invention there is provided a sealing member for a gyratory crusher having a main shaft and a mantle. The sealing member comprises a first side and a second, opposing side, wherein the first side is arrangeable on a circumference of an inner wall of the mantle, and at least a portion of the second side is at a distance from the first side, the distance being not less than the difference between a radius of the inner wall of the mantle where the sealing member is arrangeable and a radius of the outer wall of the main shaft where the sealing member is to contact the main shaft for sealing a space between the mantle and the main shaft.

With the sealing member being arrangeable on the inner wall of the mantle, it may be applied to the mantle of any gyratory crusher which typically uses wedges for centralizing, removing the need for any manual handling of such parts. The sealing member may also be applied to the mantle before installing the mantle, removing the need for manual handling when the mantle is placed on a head nut. Thus, the sealing member may replace conventional means, and may be used both to centralize the mantle around the main shaft and to seal the space there between. This provides an efficient and safe way of centralizing and sealing the mantle of a gyratory crusher.

In accordance with an embodiment of the sealing member, the first side of the sealing member is arrangeable on the inner wall of the mantle by means of adhesion. The first side of the sealing member may comprise an adhesive. It may also be possible to apply an adhesive agent to the inner wall of the mantle or to the first side of the sealing member prior to joining of the two parts. This may constitute an efficient way of arranging the sealing member at the inner wall of the mantle. The adhesive agent may be of any kind suitable for the purpose of joining the two parts.

In accordance with an embodiment of the sealing member, the sealing member is made of a flexible material. The flexible material may allow at least a portion of the sealing member to adapt, by elastic deformation, to the space available between a mantle and a main shaft of a gyratory crusher when mounted at the mantle. Having the sealing member made out of the flexible material gives extra adaptability to the sealing member allowing it to adapt into manufacturing tolerances and errors.

In accordance with an embodiment of the sealing member, the flexible material is a thermoplastic elastomer. The flexible material may also be a polyurethane.

In accordance with an embodiment of the sealing member, the sealing member comprises a void. The void may facilitate a certain degree of elastic deformation of the sealing member such that, when fitted between two surfaces at a distance from each other which is smaller than the thickness of at least a portion of the sealing member, the thickness of the portion can be reduced to seal a space between the two surfaces. It may be imagined that the void is made of a flexible material while the rest of the sealing member is not, or the whole sealing member may be made out of the same material.

In accordance with an embodiment of the sealing member, the sealing member has a width, w, of 20-100 mm, and at least a portion of the sealing member has a thickness, t, of 10-50 mm.

According to a second aspect of the invention, there is provided a mantle for a gyratory crusher comprising a sealing member as disclosed herein. Such a mantle allows for a safe and time efficient installation of the same around a main shaft of the gyratory crusher. In accordance with an embodiment of the mantle, the sealing member is arranged at a lower end thereof.

According to a third aspect of the invention, there is provided a gyratory crusher comprising a main shaft and a mantle, wherein the mantle comprises a sealing member comprising a first side and a second, opposing, side. The first side is arrangeable on a circumference of an inner wall of the mantle, and at least a portion of the second side is at a distance from the first side, the distance being not less than the difference between a radius of the inner wall of the mantle where the sealing member is arrangeable and a radius of the outer wall of the main shaft where the sealing member is to contact the main shaft for sealing a space between the mantle and the main shaft.

In accordance with an embodiment of the gyratory crusher, the sealing member is made of a flexible material. The flexible material may be sufficiently flexible for adapting to a space available between the inner and mantles and sealing the space. The flexible material may also be sufficiently rigid for providing a centralization of the mantle with respect to the main shaft, and thus not allowing a varying distance between the mantle and the main shaft along their respective inner and outer circumference. The flexible material is preferably a thermoplastic elastomer, such as rubber. It may also be a polyurethane, or any other material suitable for the purpose.

In accordance with an embodiment of the gyratory crusher, the sealing member may also comprise a void. The dimensioning of the void may be such that it allows an adequate displacement of at least a portion of the sealing member for adapting to the distance between the outer and main shafts of the gyratory crusher and provide sealing there between.

According to a fourth aspect of the invention, there is provided a method of installing a gyratory crusher comprising a main shaft, a mantle, and a sealing member. The sealing member comprises a first side and a second, opposing side, wherein the first side is arrangeable on the circumference of an inner wall of the mantle, and at least a portion of the second side is at a distance from the first side the distance being not less than the difference between a radius of the inner wall of the mantle where the sealing member is arrangeable and a radius of the outer wall of the main shaft where the sealing member is to contact the main shaft for sealing a space between the mantle and the main shaft. The method comprises the steps of arranging the sealing member at the inner wall of the mantle by means of adhesion; if required, covering the main shaft with a lubricant, such as for example beeswax; lowering the mantle over the main shaft, whereby the sealing member provides a centralized positioning of the mantle with respect to the main shaft, and seals the gap between the mantle and the main shaft thereat. The method further comprises the steps of adding backing material between the main shaft and the mantle, thus fixing the mantle against the main shaft.

For a correct height positioning of the mantle, when arranged around the main shaft, it may be lifted, e.g. by a hydraulic lifting tool, against a locking nut of the crusher until the uppermost part of the mantle is in contact with the locking nut throughout a circumference thereof. The sealing member allows backing material to be contained in the gap between the mantle and the main shaft where the sealing member is not present. Liquid backing material may thus be added from the top of the mantle and be allowed to harden, thus fixing the mantle against the main shaft. Subsequently, the locking nut may be tightened.

Use of the sealing member removes the need of handling any wedges, and instead, provides an efficient and safe method of centralizing the mantle of a gyratory crusher with respect to the main shaft. After arranging the sealing member at the inner surface of the mantle of the crusher, the mantle may simply be lowered over the main shaft and no manual manipulation is needed for achieving a centralized positioning of the mantle. Neither is there a need for any additional step of sealing the space between the lower part of the mantle and the main shaft, thus resulting in a very time efficient installation.

The method may be used both for new gyratory crusher installations, for retrofitting gyratory crushers currently using wedges, or to replace other methods for centralizing the mantle with respect to the main shaft. The sealing member, may be easily arranged at a flat surface of an inner wall of the mantle, thereby achieving an economic, safe and efficient method of installing a gyratory crusher is provided.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which:

FIG. 1 is a schematic cross-sectional view of a gyratory crusher as known in the prior art;

FIG. 2*a* is a schematic view of an embodiment of a sealing member according to a first aspect of the invention;

FIGS. 2*b* and *c* are schematic cross-sectional views of a second and third embodiment, respectively, of a sealing member according to an aspect of the invention.

DESCRIPTION OF EMBODIMENTS

Figure 3:
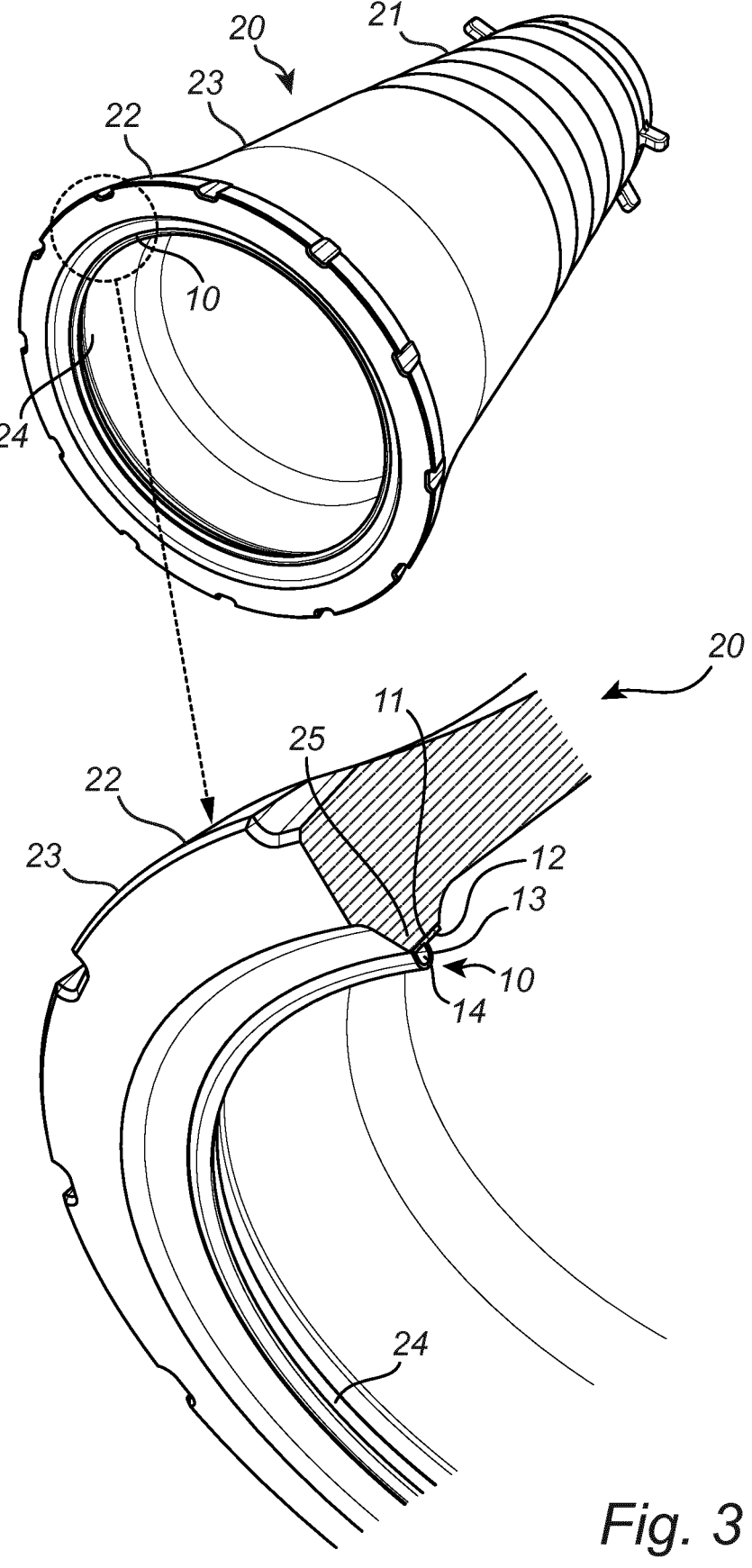
FIG. 3 is a schematic view of a mantle comprising a sealing member according to an aspect of the invention.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1A shows a part of a prior art gyratory crusher 100 comprising a mantle 1. The mantle is centralized around a main shaft 3 by means of wedges 4 arranged between the outer wall of the main shaft 3 and the inner wall of the mantle 1. Generally, four wedges 4 are provided, evenly distributed around the circumference of the outer wall of the main shaft 3. A mantle 1 of this kind can typically weigh 5 to 13 tons. The wedges 4 are installed between the outer wall of the main shaft 3 and the inner wall of the mantle 1 manually, i.e. by hand, while the mantle is supported by a hydraulic or other supporting or lifting tool. Considering the weight of the mantle, the manual installation of the wedges is, apart from being time consuming, to be seen as a task of considerable risk.

FIG. 2*a* shows an embodiment of a sealing member 10 for a mantle according to a first aspect of the invention. The sealing member 10 comprises a first side 11 and a second, opposing side 12. The first side 11 is substantially flat, providing a surface which can be arranged against another substantially flat surface. The first side 11 is arrangeable on the circumference of an inner wall of a mantle of a gyratory crusher. In an embodiment of the sealing member 10, the first side 11 comprises an adhesive for adhering to a surface, e.g. the inner surface of the mantle of a gyratory crusher.

The second side 12 comprises a protrusion 13 arranged on one end of the second side 12. In the shown embodiment, the protrusion 13 has a void 14, the void 14 yielding a p-shaped cross-section of the sealing member 10. The void 14 allows the protrusion 13 to adapt to different spaces, allowing for the sealing member 10 to adapt to a variety of spaces and still giving efficient sealing. The protrusion 13 is not restricted to the end of the second side 12, but could instead be arranged at a central portion of the second side 12 of the sealing member 10. An example of a protrusion being arranged centrally on a second side 42 is shown on FIG. 2*b*. The outer shape of the protrusion may be any shape, which is suitable for sealing, such as rectangular a rectangular shape as shown on FIG. 2*c*. The protrusion may also comprise a ribbed portion 53 at an end surface thereof, see FIG. 2*c*. A skilled person realizes that other shapes or cross sections of the sealing member 10, are possible within the inventive concept. For example, the sealing member 10 may have a D-shaped cross-section. It is also possible, within the inventive concept, that the entire second side 12 protrudes with respect to the first side 11 and that there is at least one void 14 between the first side 11 and the protruding second side 12. The protrusion 13 presents the largest thickness, t, of the sealing member 10, with the protrusion being adapted to the gyratory crusher it is to be used with. Generally, the thickness is in the range of 10-50 mm. As a further example only, the largest thickness of the sealing member 10 is 20-30 mm.

The sealing member 10 is elongated in a longitudinal direction and can be adapted to match the length of the circumference of an inner wall of a mantle of a gyratory crusher. The width, w, of the sealing member 10 is generally significantly smaller than the length. As an example only, the width may be in the range of 30-100 mm.

The sealing member 10 is made of a flexible material to allow a certain degree of elastic deformation of the sealing member 10, to allow for the sealing member 10 to adapt to a space in between which it is arranged. Typically, the flexible material is a thermoplastic elastomer, e.g. a rubber.

Other flexible materials may also be suitable for the sealing member 10 and are thus possible within the inventive concept.

FIG. 3 shows a mantle 20 of a gyratory crusher according to a second aspect of the invention. The mantle 20 is generally cone-shaped and comprises an upper end 21 and a lower end 22. The mantle 20 further comprises an outer wall 23 and an inner wall 24. In the shown embodiment, at the lower end 22 of the mantle 20, the inner wall 24 comprises a protrusion 25. The mantle 20 further comprises a sealing member 10 arranged at the protrusion 25 of the inner wall 24. The sealing member 10 comprises a first side 11 and a second, opposing side 12. The first side 11 is arranged at the circumference of the protrusion 25 of the of the inner wall 24 of the mantle 20. The second side 12 comprises at least a portion protruding from the first side 11, which protruding portion 13 comprises at least one void 14. The first side 11 of the sealing member 10 is arranged at the inner wall 24 of the mantle 20 by means of an adhesive agent suitable for providing a bond there between.

Figure 4:
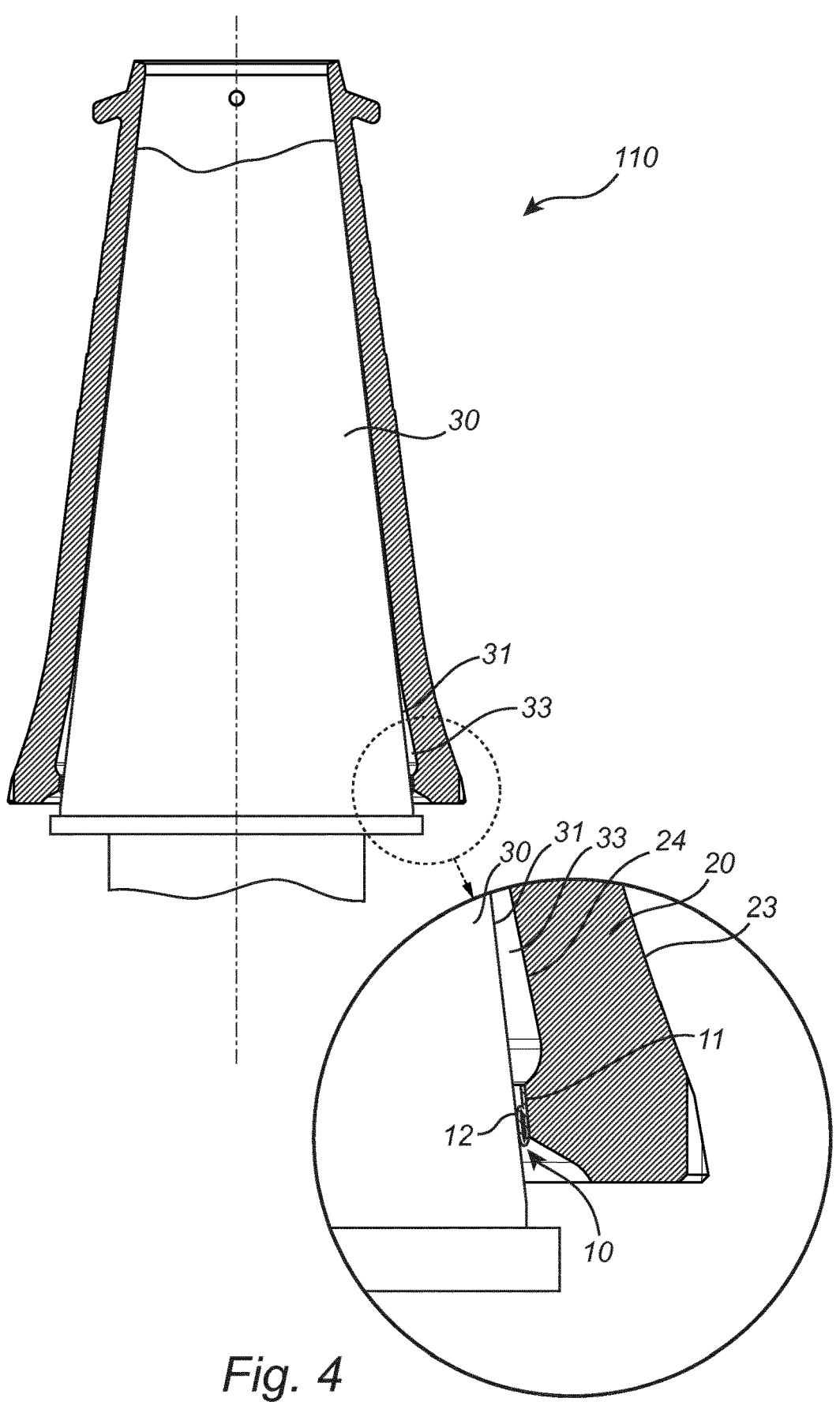
FIG. 4 is a schematic view of a gyratory crusher comprising a mantle with a sealing member according to an aspect of the invention.

FIG. 4 shows a part of a crusher 110 comprising and mantle 20 and a main shaft 30. The main shaft 30 comprises an outer wall 31. The mantle 20 is arranged around the main shaft 30 such that the inner wall 24 of the mantle 20 is facing the outer wall 31 of the main shaft 30. The dimensions of the mantle 20 are such that a space 33 between the inner wall of the mantle 24 and the outer wall 31 of the main shaft 31 is present. For correct functioning of the gyratory crusher 110, the space 33 needs to be homogeneous around the circumference of the main shaft 30. Positioning of the mantle 20 has been found to be greatly facilitated by the use of the sealing member 10 herein disclosed. The sealing member 10 comprises a first side 11 arrangeable on the inner wall 24 of the mantle 20, and a second opposing side 12. At least a portion of the second side 12 is at a distance from the first side 11 which is not less than a distance between the inner wall 24 of the mantle 20 and an outer wall 31 of the main shaft 30 of the mounted gyratory crusher 110, thereby sealing the space 33 there between. The sealing member 10 is sufficiently rigid to provide a centralizing of the mantle 20 around the main shaft 30. It is furthermore sufficiently flexible to adapt to a space between the main shaft 30 and the mantle 20, the space may be of a dimension slightly smaller than the largest thickness of the sealing member 10. The deformability of the sealing member 10 will compensate for any tolerances between the mantle and the main shaft. If the two parts are manufactured to match one another perfectly, the protrusion 25 could act as sealing and centralizing member. However, perfect manufacturing is not possible in most cases, therefore the sealing member 10 can be used to compensate for the tolerances of the two parts.

The skilled person realizes that a number of modifications of the embodiments described herein are possible without departing from the scope of the invention, which is defined in the appended claims.

The invention claimed is:

1. A mantle for a gyratory crusher including a main shaft having an outer wall, wherein the mantle is mountable to the main shaft such that a space is present between the mantle and the outer wall of the main shaft, the mantle comprising:
    a mantle body including an inner wall and an outer wall;
    a sealing member configured to centralize the mantle on the main shaft upon installation of the mantle on the main shaft, the sealing member comprising a first side and a second, opposing, side, wherein the first side of the sealing member is mounted directly to an inner circumference of the inner wall of the mantle, and the second side comprises at least a protruding portion that extends from the first side, wherein the protruding portion comprises at least one void, wherein the protruding portion entirely delimits the void within the protruding portion, and wherein the protruding portion extends a distance from the first side such that, when the mantle is installed on the main shaft, the protruding portion of the sealing member is configured to contact the outer wall of the main shaft for sealing a space between the mantle and the main shaft.

2. The mantle according to claim 1, wherein the first side of the sealing member is arrangeable on the inner wall of the mantle by means of adhesion.

3. The mantle according to claim 2, wherein the first side of the sealing member comprises an adhesive.

4. The mantle according to claim 1, wherein the sealing member is made of a flexible material.

5. The mantle according to claim 4, wherein the flexible material is a thermoplastic elastomer.

6. The mantle according to claim 4, wherein the flexible material is a polyurethane.

7. The mantle according to claim 1, wherein the sealing member has a width, w, of 20-100 mm, and at least a portion of the sealing member is of a thickness, t, of 10-50 mm.

8. The mantle according to claim 1, wherein the sealing member is arranged at a lower end of the mantle.

9. A gyratory crusher comprising:

a main shaft including an outer wall;

a mantle mounted to the main shaft and including a mantle body including an inner wall and an outer wall; and a sealing member for centralizing the mantle around the main shaft upon installation of the mantle on the main shaft and for sealing a space between the inner wall of the mantle and the outer wall of the main shaft, the sealing member comprising a first side and a second, opposing, side, wherein the first side is mounted directly to a circumference of the inner wall of the mantle, and the second side comprises at least a protruding portion that extends from the first side, wherein the protruding portion comprises at least a void, wherein the protruding portion entirely delimits the void within the protruding portion, and wherein the protruding portion extends a distance from the first side, the distance being not less than a difference between a radius of the inner wall of the mantle where the sealing member is attached and a radius of the outer wall of the main shaft where the protruding portion of the sealing member contacts the main shaft, wherein the sealing member seals the space between the mantle and the main shaft for backing material pouring.

10. The gyratory crusher according to claim 9, wherein the first side of the sealing member is arranged at the inner wall of the mantle by means of adhesion.

11. The gyratory crusher according to claim 9, wherein the sealing member is made of a flexible material.

12. A method of installing a gyratory crusher comprising a main shaft and a mantle, the method comprising the steps of:

arranging a sealing member along a portion of an inner wall of the mantle, the sealing member including a first side and a second, opposing, side, the first side being directly attached along an entirety of a circumference of the inner wall of the mantle and at least a portion of the second side of the sealing member being a distance from the first side, wherein the distance is not less than a difference between a radius of the inner wall of the mantle where the sealing member is arranged and a radius of an outer wall of the main shaft where the sealing member is to contact the main shaft such that the sealing member creates a continuous seal around the circumference of the inner wall of the mantle to seal a space between the mantle and the main shaft;

lowering the mantle over the main shaft whereby the second side of the sealing member contacts the outer wall of the main shaft to center the mantle with respect to the main shaft, and to seal the space between the mantle and the main shaft thereat; and adding backing material between the main shaft and the mantle.

* * * * *